United States Patent
Thornton et al.

(10) Patent No.: US 10,150,369 B2
(45) Date of Patent: Dec. 11, 2018

(54) BI-DIRECTIONAL OVERRUNNING CLUTCH

(71) Applicant: Super ATV, LLC, Madison, IN (US)

(72) Inventors: Ken Thornton, Canaan, IN (US); Dennis Kent, Madison, IN (US); Chris Shelton, Madison, IN (US); Jordan E. Stephan, Hanover, IN (US); Damon Stephan, Madison, IN (US)

(73) Assignee: Super ATV, LLC, Madison, IN (US)

( * ) Notice: Subject to any disclaimer, the term of this patent is extended or adjusted under 35 U.S.C. 154(b) by 140 days.

(21) Appl. No.: 15/398,771

(22) Filed: Jan. 5, 2017

(65) Prior Publication Data

US 2017/0210226 A1    Jul. 27, 2017

Related U.S. Application Data

(60) Provisional application No. 62/281,216, filed on Jan. 21, 2016.

(51) Int. Cl.
*B60K 23/08* (2006.01)
*F16H 48/06* (2006.01)
(Continued)

(52) U.S. Cl.
CPC .............. *B60K 23/08* (2013.01); *B60K 17/02* (2013.01); *B60K 17/346* (2013.01);
(Continued)

(58) Field of Classification Search
CPC ...... B60K 23/08; B60K 17/346; B60K 17/02; F16H 48/06; F16D 15/00; F16D 27/10;
(Continued)

(56) References Cited

U.S. PATENT DOCUMENTS

| | | |
|---|---|---|
| 3,180,469 A | 4/1965 | Wiedmann et al. |
| 3,640,364 A | 2/1972 | Utton |
| | (Continued) | |

FOREIGN PATENT DOCUMENTS

| | | |
|---|---|---|
| CN | 1702947 A | 11/2005 |
| CN | 201107845 Y | 8/2008 |
| | (Continued) | |

OTHER PUBLICATIONS

Machine Translation of Abstract for JP 63069060A by Lexis Nexis Total Patent on Jul. 21, 2015, (3 pages).
(Continued)

*Primary Examiner* — Mark J Beauchaine
(74) *Attorney, Agent, or Firm* — Woodard, Emhardt, Moriarty, McNett & Henry LLP

(57) ABSTRACT

Certain embodiments of the present disclosure describe a differential assembly for allowing a vehicle to switch between two-wheel drive and four-wheel drive. The differential assembly includes a bearing assembly positioned between a race gear and output hubs. An armature plate is rotationally coupled to the bearing assembly and a clutch plate is positioned to engage the armature plate. A biasing member biases the clutch plate to engage the armature plate and allow the bearing assembly to transmit torque between the race gear and output hubs. When electricity is provided to an electromagnet, the electromagnet exerts a magnetic force on the clutch plate that is sufficient to overcome the bias of the biasing member so the clutch plate does not engage the armature plate and the bearing assembly does not transmit torque from the race gear to the output hubs.

20 Claims, 6 Drawing Sheets

(51) Int. Cl.
*B60K 17/346* (2006.01)
*B60K 17/02* (2006.01)
*F16D 27/112* (2006.01)
*F16D 41/067* (2006.01)

(52) U.S. Cl.
CPC .......... *F16D 27/112* (2013.01); *F16D 41/067* (2013.01); *F16H 48/06* (2013.01); *B60K 2023/0858* (2013.01); *B60Y 2400/80* (2013.01); *B60Y 2400/82* (2013.01)

(58) Field of Classification Search
CPC ........ F16D 7/021; F16D 7/005; F16D 41/066; B60Y 2400/82; B60Y 2400/80
See application file for complete search history.

(56) References Cited

U.S. PATENT DOCUMENTS

| | | | |
|---|---|---|---|
| 4,602,705 A | 7/1986 | Farr et al. | |
| 5,924,510 A * | 7/1999 | Itoh | B60K 17/3505 180/197 |
| 6,318,338 B1 | 11/2001 | Kawamura et al. | |
| 2012/0000742 A1 | 1/2012 | Sekella | |

FOREIGN PATENT DOCUMENTS

| | | |
|---|---|---|
| JP | 63069060 A | 3/1988 |
| WO | WO 2015058765 A1 | 4/2015 |

OTHER PUBLICATIONS

Machine Translation of CN1702947A by Lexis Nexis Total Patent on Jul. 21, 2015, ((5 pages).
Machine Translation of CN201107845Y by Lexis Nexis Total Patent on Jul. 21, 2015, (7 pages).
Machine Translation of WO2015058765A1 by Lexis Nexis Total Patent on Jul. 21, 2015, (8 pages).

\* cited by examiner

BI-DIRECTIONAL OVERRUNNING CLUTCH

CROSS REFERENCE TO RELATED APPLICATIONS

This application claims priority to U.S. Provisional Patent Application No. 62/281,216, filed Jan. 21, 2016; which is incorporated herein by reference.

BACKGROUND

This disclosure is in the field of vehicle differentials.

Four-wheel drive is a useful feature for vehicles that are used in situations where traction may be an issue. For example, off-road vehicles may have four-wheel drive for navigating dirt roads, gravel roads, or bumpy terrain. Four-wheel drive may also be useful in rainy and snowy conditions to provide increased traction and improved acceleration. However, in some cases when traction is not an issue, four-wheel drive may not be necessary. Two-wheel drive can improve fuel economy and produces less wear and tear on the engine and the drive train of the vehicle. Therefore, it may be beneficial for the vehicle to be able to switch between operating in two-wheel drive and four-wheel drive when necessary.

DETAILED DESCRIPTION OF THE DRAWINGS

Figure 1:
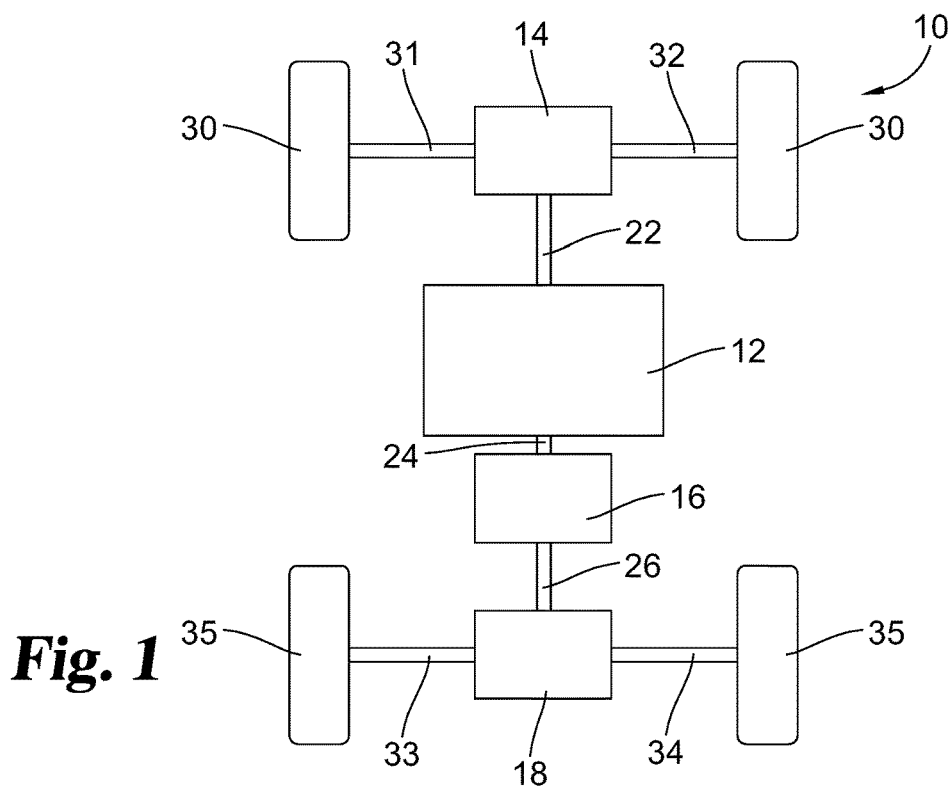
FIG. 1 is a schematic representation of a vehicle including a differential assembly.

Reference will now be made to certain embodiments and specific language will be used to describe the same. It will nevertheless be understood that no limitation of the scope of this disclosure and the claims is thereby intended, such alterations, further modifications and further applications of the principles described herein being contemplated as would normally occur to one skilled in the art to which this disclosure relates. In several figures, where there are the same or similar elements, those elements are designated with the same or similar reference numerals.

The present disclosure pertains to a differential that is selectively engageable between two-wheel drive and four-wheel drive. Aspects of the present disclosure include a differential assembly including a main housing assembly, a ring gear assembly, and a cap housing assembly. The main housing assembly may include a housing that defines a hollow interior. A pinion gear may be attached to the housing so that a portion of the pinion gear extends into the hollow interior of the housing and another portion of the pinion gear extends outside the housing. The portion of the pinion that extends outside the housing may operationally connect with a drive shaft of a vehicle.

The ring gear assembly may include a ring gear that defines a hollow interior opening. An interior surface of the ring gear may include ridges so that the interior surface has a variable geometry. A bearing assembly may be inserted into the hollow interior opening of the ring gear. The bearing assembly may include bearings that are held by spring clips and biased to be positioned between the ridges on the interior surface of the ring gear. The bearing assembly may be rotationally coupled to an armature plate. A pair of output hubs may be inserted into an opening defined by the bearing assembly, constraining the bearings of the bearing assembly between the interior surface of the ring gear and the output hubs. Each of the output hubs may define an axle opening for receiving the axle of a wheel from a vehicle.

The cap housing assembly may include a cap housing that defines a hollow interior with various openings for insertion of additional components. For example, cap housing may define a magnet slot for an electromagnet and may define biasing member openings for holding biasing members. Cap housing assembly may also include a clutch plate that is positioned to interact with the electromagnet and the biasing members.

The cap housing assembly is attached to the main housing assembly and the ring gear assembly is positioned between the two assemblies, in the hollow interiors of the cap housing assembly and the main housing assembly. The ring gear assembly is positioned so that the ring gear is operationally attached to the portion of the pinion gear that is located in the interior of the main housing assembly. The ring gear assembly is also positioned so that the clutch plate from the cap housing assembly may engage the armature plate.

In certain embodiments, the clutch plate is located between the biasing members and the armature plate and is also located between the electromagnet and the armature plate. When no electricity is provided to the electromagnet, the biasing members bias the clutch plate so that it engages and causes drag on the armature plate. Because the armature plate is rotationally coupled to the bearing assembly, drag is also produced on the bearing assembly. When the rotation of the bearing assembly slows, the bearings are moved to a location near the ridges of the interior surface of the ring gear. While in this position, if the front wheels of the vehicle slip, the ring gear starts to rotate faster than the output hubs, and the bearings become wedged between the ridges on the ring gear and the output hubs. When the bearings are wedged in this position, torque is transferred from the ring gear to the output hubs, and the vehicle is in four-wheel drive.

When electricity is provided to the electromagnet, the electromagnet exerts a magnetic force on the clutch plate that is sufficient to overcome the bias of the biasing members so that the clutch plate does not engage the armature plate. This allows the armature plate, and the bearing assembly, to freely rotate. When there is no drag on the armature plate, the bearings in the bearing assembly are maintained in a relatively centered position between the ring gear and the output hubs. The bearings are not wedged between the ring gear and the output hubs, so there is no torque transfer between the ring gear and the output hubs. In this arrangement, the vehicle is in two-wheel drive.

The term "engage" as used in this description means that two or more mechanisms or components are connected so that a motion or action of one of the mechanisms or components has an effect on the motion or action of another mechanism or component. This effect can be the result of direct contact between the two mechanisms or through an operational connection in which intermediary components connect the engaged mechanisms even though there is no direct contact.

The term "rotationally coupled" as used in this description means a link between two components wherein rotation of one of the components causes rotation of the other component. The components may be in direct contact or the coupling may include intermediary pieces.

FIG. 1 is a schematic view of a vehicle 10. Vehicle 10 includes a power source 12. Power source 12 could be an engine, a transmission connected to the engine, or any other source of power. Vehicle 10 also includes a front differential assembly 14, a center differential assembly 16, and a rear differential assembly 18. Front differential 14 is connected to power source 12 by a drive shaft 22. Power source 12 is connected to center differential 16 by a drive shaft 24. Center differential 16 is connected to rear differential 18 by a drive shaft 26. In some embodiments, the center differential 16 could be incorporated into the transmission (not shown) of the vehicle. In other embodiments, the rear differential 18 may also be incorporated into the transmission.

Front wheel axles 31, 32 connect front wheels 30 to front differential 14 and drive front wheels 30. Rear wheel axles 33, 34 connect rear wheels 35 to rear differential 18 and drive rear wheels 35.

Figure 2:
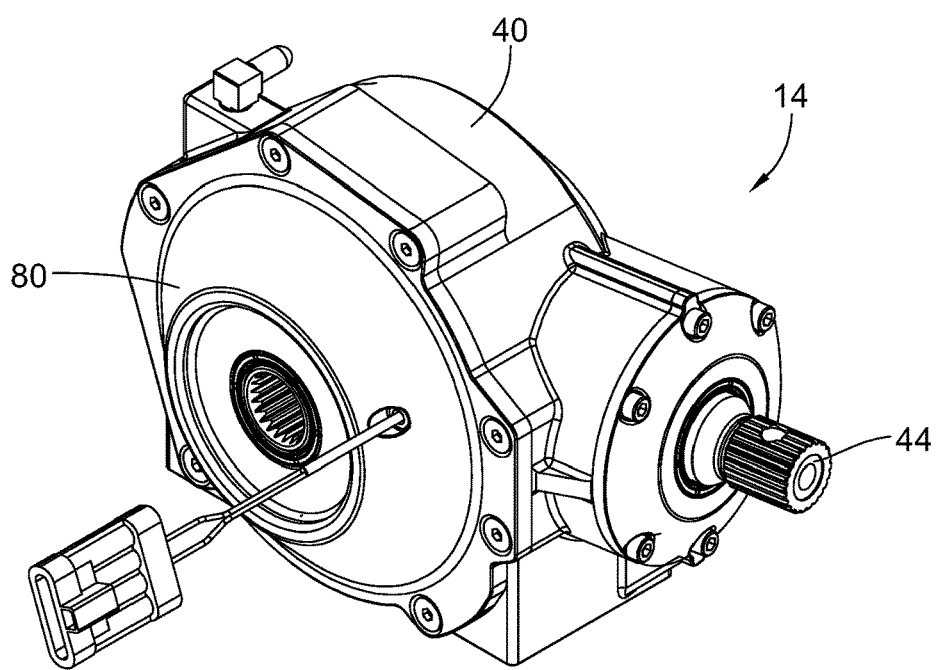
FIG. 2 is a perspective view of differential assembly.
Figure 3:
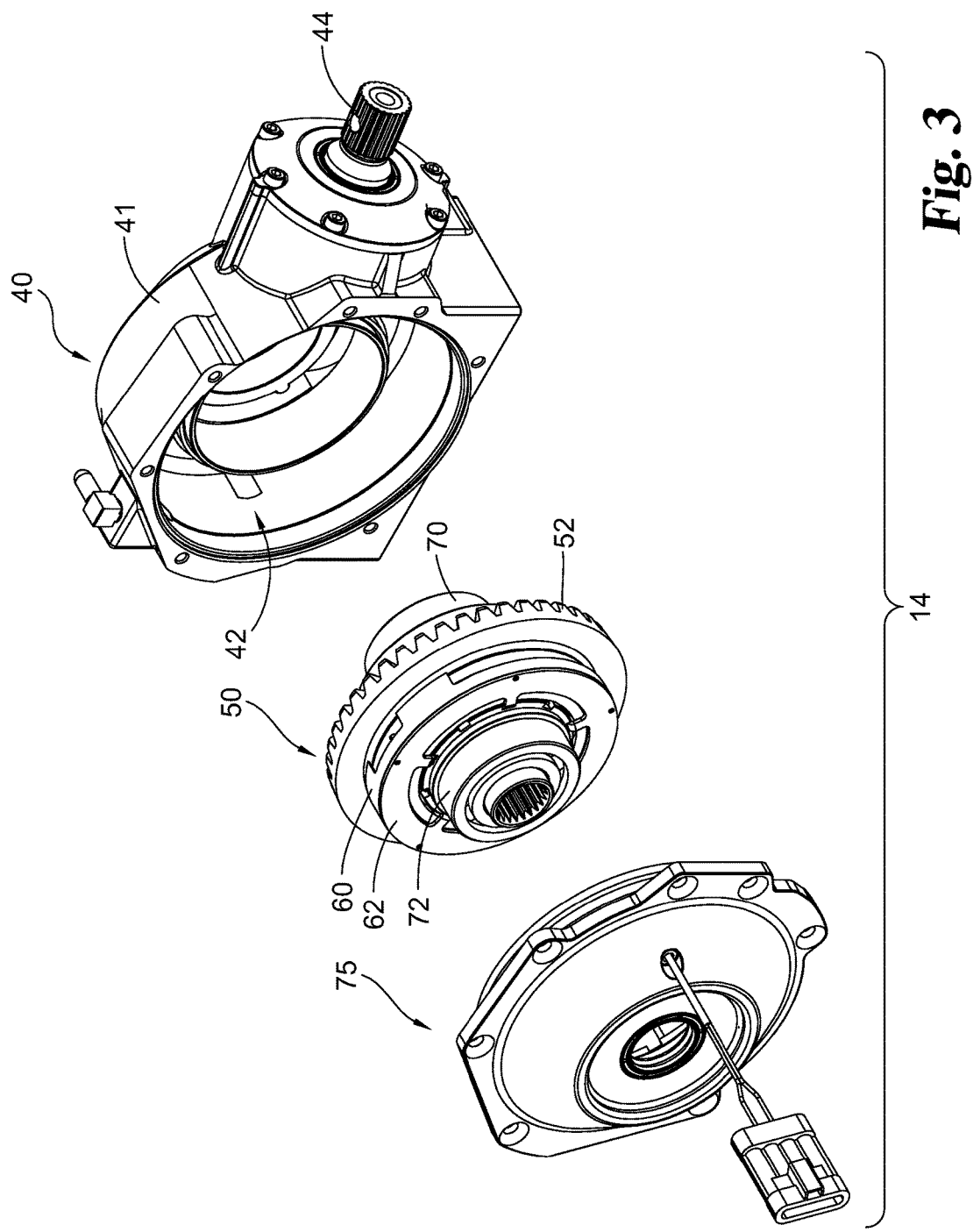
FIG. 3 is an exploded perspective view of the differential assembly of FIG. 2.

FIGS. 2-3 show an embodiment of front differential assembly 14. Differential assembly 14 includes a main housing assembly 40, a ring gear assembly 50, and a cap housing assembly 75. Rear differential 18 may be set up similarly to front differential 14.

Main housing 40 includes a housing 41 that defines a hollow interior 42 and a pinion gear 44. One end of pinion gear 44 extends into interior 42 of housing 41, and the other end of pinion gear 44 extends outside of housing 41. The portion of pinion gear 44 that extends outside of housing 41 may be connected to drive shaft 26.

Figure 4:
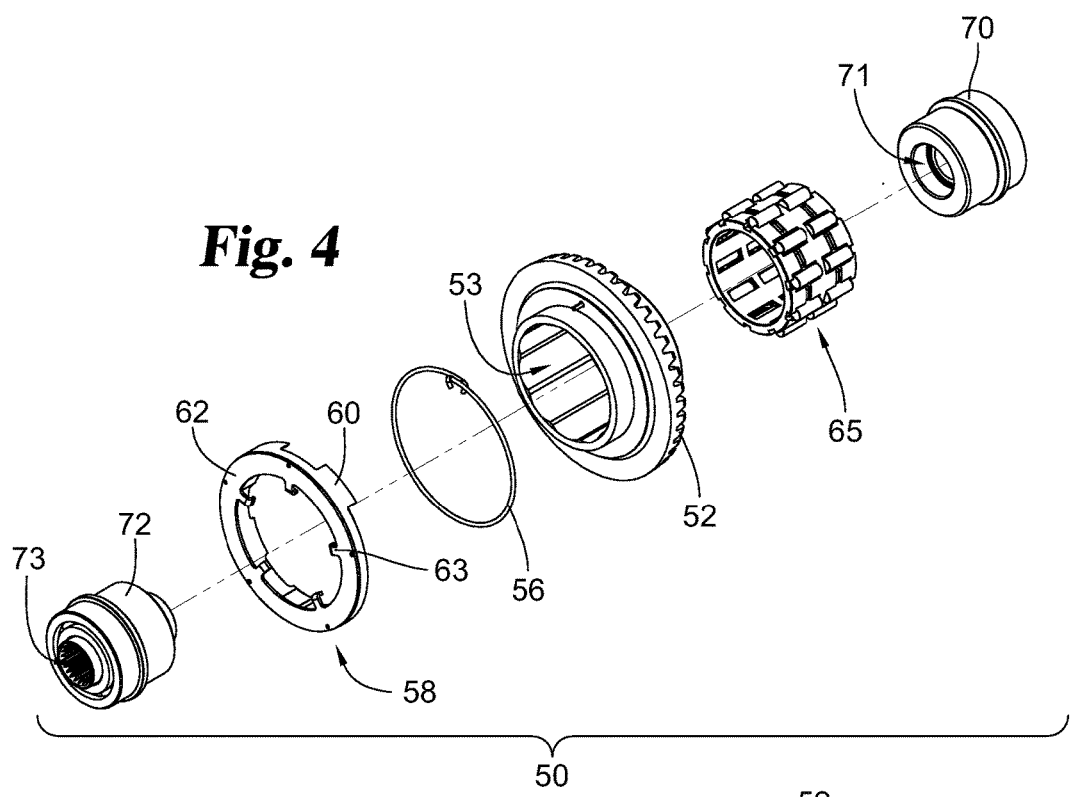
FIG. 4 is an exploded perspective view of a ring gear assembly from the differential assembly of FIG. 2.
Figure 5:
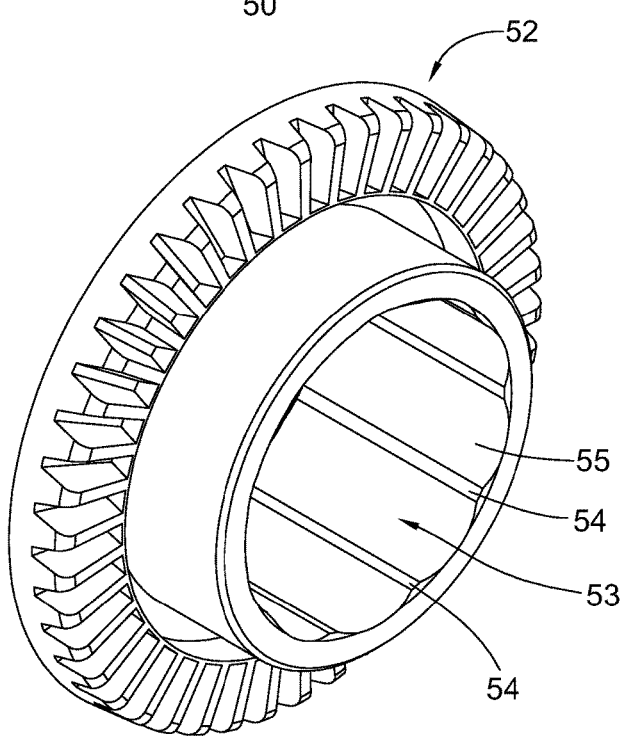
FIG. 5 is a perspective view of a ring gear from the ring gear assembly of FIG. 4.

An exploded view of ring gear assembly 50 is shown in FIG. 4. Ring gear assembly includes a ring gear 52 that defines a hollow interior opening 53. As seen in FIG. 5, the outer portion of ring gear 52 may be splined so that ring gear 52 may be connected to the end of pinion gear 44 that extends into interior 42 of housing 41. This connection allows pinion gear 44 to drive ring gear 52. An interior surface 55 of ring gear 52 that surrounds interior opening 53 includes ridges 54, producing a variable geometry within opening 53.

Figure 6:
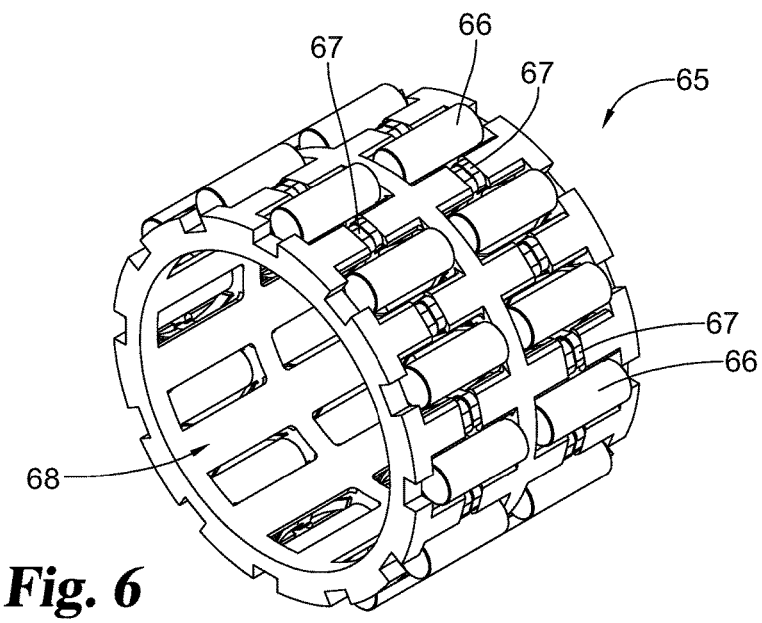
FIG. 6 is a perspective view of a bearing assembly from the ring gear assembly of FIG. 4.

A bearing assembly 65 defining an opening 68 may be fit into hollow interior opening 53 of ring gear 52. As shown in FIG. 6, bearing assembly 65 includes bearings 66 that are positioned in openings defined by the body of bearing assembly 65. Spring clips 67 bias bearings 66 so that they float in the center of the openings in the body of bearing assembly 65.

A torsion spring 56 may be attached to a side of ring gear 52 and held in place by a torsion spring retainer 60. An armature plate 62 may be positioned on torsion spring retainer 60 on the opposing side of ring gear 52. Armature plate 62 may be positioned so that fingers 63 extending from armature plate 62 contact bearing assembly 65 when bearing assembly 65 is inserted into interior hollow opening 53.

Output hubs 70, 72 may be mated to each other and inserted into opening 68 of bearing assembly 65 (see FIG. 3). The insertion of output hubs into opening 68 of bearing assembly 65 places bearings 66 between interior surface 55 of ring gear 52 and output hubs 70, 72. Output hub 70 defines an axle opening 71 for receiving rear axle 33. Output hub 72 defines an axle opening 73 for receiving rear axle 34.

Figure 7:
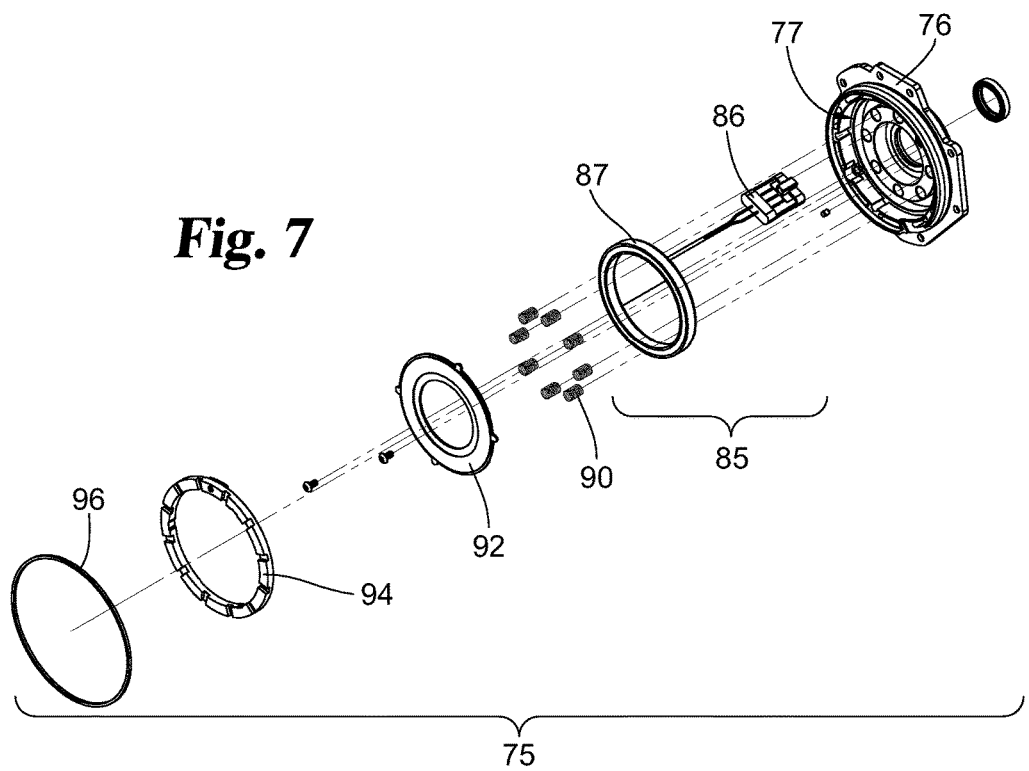
FIG. 7 is an exploded view of a cap housing assembly from the differential assembly of FIG. 2.

An exploded view of cap housing assembly 75 is shown in FIG. 7. Cap housing assembly 75 includes a cap housing 76 that defines an interior portion 77. As shown more clearly in FIG. 8, interior portion 77 includes a magnet slot 78 and a biasing member opening 79. An armature opening 80 is positioned adjacent to magnet slot 78 and biasing member opening 79. A spacer opening 81 is positioned at the edge of interior portion 77 adjacent to armature opening 80.

An electromagnet 87 may be fit into interior portion 77 within magnet slot 78. An electrical coupler 86 is electrically connected to electromagnet 87 and extends exteriorly from cap housing 76. In the embodiment shown, electromagnet 87 is a ring magnet; however, in other embodiments, different shapes other than an annular ring may be used for electromagnet 87. Additionally, in some embodiments, multiple magnets may be used and inserted into separate magnet slots 78 in interior portion 77. Multiple openings may be defined in cap housing 76 so more than one magnet may be inserted into cap housing 76.

Biasing member 90 may be inserted into biasing member openings 79 in cap housing 76. In the embodiment shown, there are eight biasing members 90 fit into respective openings 79 in cap housing 76. However, in other embodiments, there may be more biasing members 90 or fewer biasing members 90. Also, the biasing members shown in FIG. 7 are springs, but in other embodiments, any suitable mechanism that can impart bias may be used.

Figure 8:
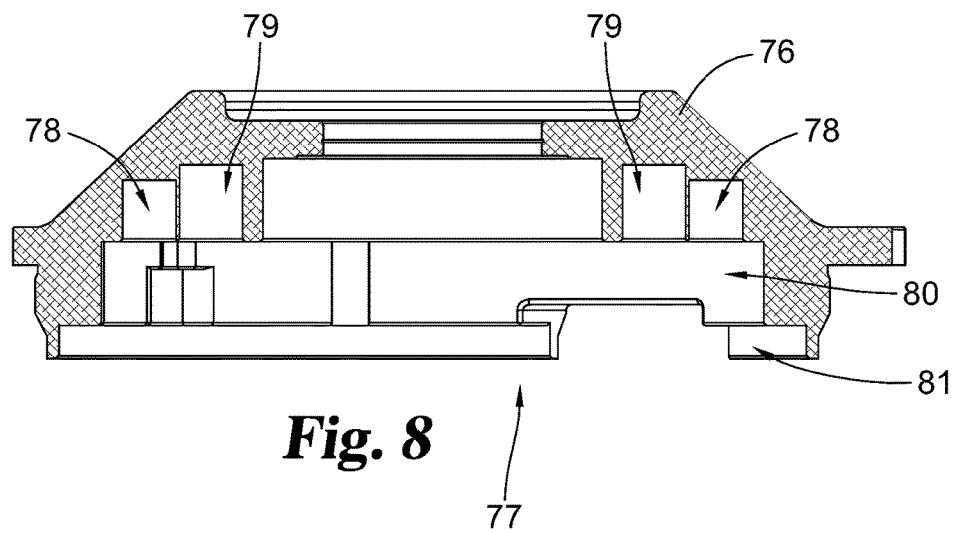
FIG. 8 is a front cross-sectional view of the cap housing assembly of FIG. 7 with internal components removed.

In the embodiment shown in FIG. 8, slot 78 for electromagnet 87 is positioned radially outward of opening 79 for receiving biasing member 90. In other embodiments, the position of slot 78 and opening 79 may be adjusted so that opening 79 for biasing member 90 is located radially outward of slot 78 for electromagnet 87.

Cap housing assembly 75 also includes a clutch plate 92, a spacer 94, and an O-ring seal 96. Clutch plate 86 is inserted into armature opening 80 of interior portion 77 of cap housing 76 so that it may interact with biasing members 84. Spacer 94 is positioned into spacer opening 81. O-ring seal 90 fits around housing 76 to provide a seal between cap housing assembly 75 and main housing assembly 40.

Figure 9:
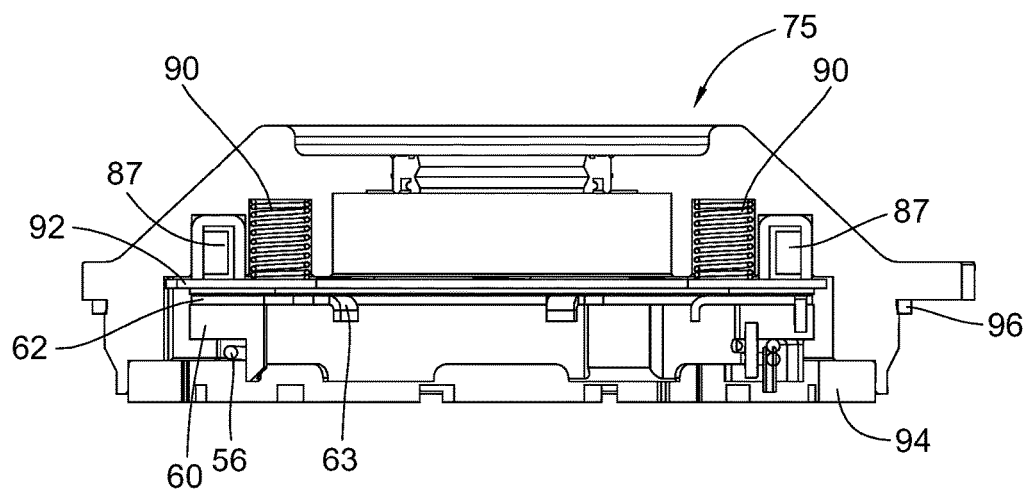
FIG. 9 is a front cross-sectional view of the cap housing assembly of FIG. 7 connected to the ring gear assembly of FIG. 5.

FIG. 9 illustrates a cross-section of an assembled cap housing assembly 75. Electromagnet 87 is fit within magnet slot 78, and biasing members 90 are inserted into openings 79. Clutch plate 86 is inserted into armature opening 80 so that clutch plate 86 is adjacent biasing members 90 and is adjacent to electromagnet 87. In some embodiments, although not required, clutch plate 86 may be in direct contact with biasing member 90. Armature plate 62 and torsion spring retainer 60 are also inserted into armature opening 80 so that armature plate 62 is adjacent to clutch plate 92. Clutch plate 92 is positioned between armature plate 62 and electromagnet 87 and also positioned between armature plate 62 and biasing member 90. Spacer plate 94 is inserted into spacer opening 81. An opening defined through spacer plate 94 has a diameter that is large enough to allow armature plate 62 and torsion spring retainer 60 to extend through the opening.

In use, engagement of the bearings 66 in bearing assembly 65 with the inner surface of ring gear 52 and output hubs 70, 72 allows torque to be transferred from drive shaft 26 to rear wheel axles 33, 34. The rotational position of bearing assembly 65 with respect to the ring gear 52 and the output hubs 70, 72 may be adjusted to either allow engagement between bearings 66 and ring gear 52 and output hubs 70, 72 or to disallow engagement when it is not desired to transfer torque to rear wheel axles 33, 34.

To allow availability of four-wheel drive, differential assembly 14 is placed in a first state in which no power is provided to electromagnet 87. In the first state, biasing members 90 bias clutch plate 92 so that clutch plate 92 engages armature plate 62. The interaction between armature plate 62 and clutch plate 92 causes drag on armature plate 62, causing armature plate 62 to rotate more slowly than ring gear 52. Because armature plate 62 is rotationally coupled to bearing assembly 65, for example by fingers 63, when armature plate 62 is caused to drag by clutch plate 92, the rotation of bearing assembly 65 is also slowed with respect to ring gear 52.

Figure 10A:
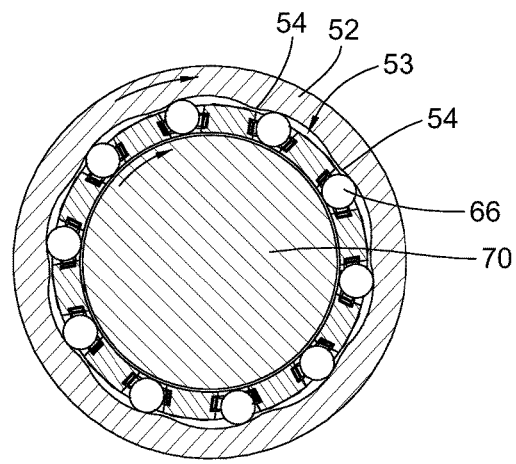
FIG. 10A is a cross-sectional representation of a bearing assembly between a ring gear and an output hub in a four-wheel drive available position when power is not supplied to an electromagnet.

Slowing the rotation of bearing assembly 65 causes bearings 66 to be positioned near ridges 54 on interior surface 55 of ring gear 52 (see FIG. 10A). In this position, bearings 66 contact ring gear 52, but do not contact output hub 70 (or output hub 72), causing bearing assembly 65 to rotate with ring gear 52 but not with output hub 70. Therefore, torque is not transferred between ring gear 52 and output hub 70, and the vehicle remains in two-wheel drive.

Figure 10B:
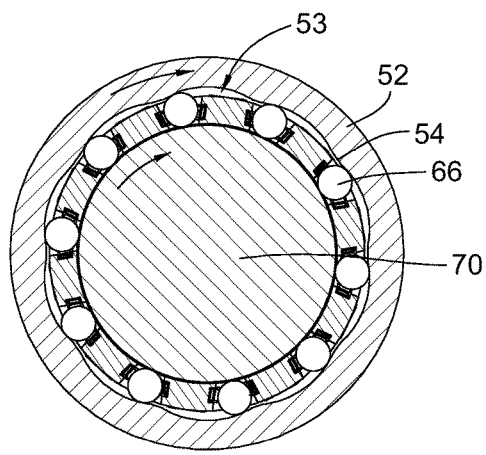
FIG. 10B is a cross-sectional representation of a bearing assembly between a ring gear and an output hub in an engaged position to allow transfer of torque between the ring gear and the output hub.

However, when the front wheels 30 of vehicle 10 start to slip, the rotational speed of drive shaft 26 starts to increase. Because ring gear 52 is rotationally connected to drive shaft 26, the rotational speed of ring gear 52 also increases. This causes the relative rotational speed of ring gear 52 to increase with respect to output hub 70. As the speed of ring gear 52 increases with respect to output hub 70, bearing 66 slides backward with respect to ring gear 52 so that it is wedged between ridge 54 of ring gear 52 and output hub 70 (see FIG. 10B). When bearing 66 is wedged between ring gear 52 and output hub 70, torque is transferred between ring gear 52 and output hub 70, putting vehicle 10 into four-wheel drive.

Once the front wheels 30 of vehicle 10 stop slipping, the rotational speed of ring gear 52 decreases with respect to the rotational speed of output hub 70 and bearings 66 are returned to the position shown in FIG. 10A. Thus, the vehicle is returned to two-wheel drive until the front wheels began to slip again.

An overrunning feature of differential 14 allows bearings 66 to disengage from ring gear 52 even when the vehicle is in four-wheel drive. As an example, when the vehicle is turning, it is desirable for the outer wheel to rotate faster than the inner wheel because the outer wheel has to cover more distance than the inner wheel. The bearings 66 from the outer wheel are allowed to disengage from ring gear 52 to allow the outer wheel to rotate faster than the inner wheel and the drive shaft. If the inner wheel starts to slip while the outer wheel is overrunning, the rotation speed of the drive shaft will increase until it catches up with the speed of the outer wheel, so that the outer wheel stops overrunning and is driven by the drive shaft until traction is regained.

To keep the vehicle in two-wheel drive, even when the front wheels of the vehicle are slipping, differential assembly 14 may be placed in a second state in which an external power supply provides electricity to electromagnet 87. This causes electromagnet 87 to exert a magnetic force on clutch plate 92 that is sufficient to overcome the biasing force of biasing members 90. This magnetic force causes clutch plate 92 to stop engaging armature plate 62 and stop applying drag force on armature plate 62. Therefore, armature plate 62 is free to rotate with bearing assembly 65 with respect to ring gear 52.

Figure 10C:
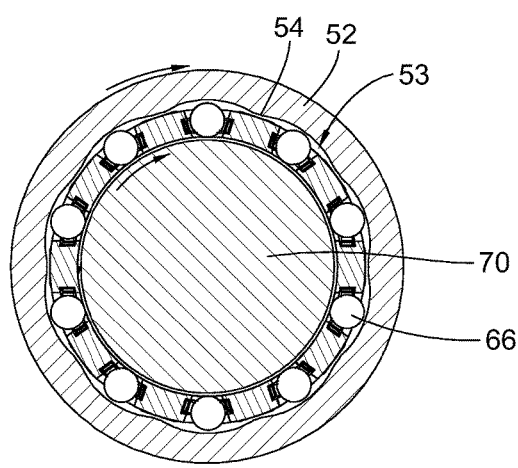
FIG. 10C is a cross-sectional representation of a bearing assembly between a ring gear and an output hub in an unengaged, two-wheel drive position when power is supplied to an electromagnet.

When no drag is exerted on armature plate 62, there is also no drag exerted on bearing assembly 65. When there is no drag on bearing assembly 65, bearings 66 are positioned between ring gear 52 and output hub 70 so no torque is transferred between ring gear 52 and output hub 70 (see FIG. 10C). Springs 67 support bearings 66 so that they stay unengaged from ring gear 52 and output hub 70. Because no torque is transferred between ring gear 52 and output hub 70 axles 33, 34 are not driven by drive shaft 26.

In some embodiments, the external power supply may be controlled by an electronic control system. In other embodiments, a driver of a vehicle may selectively control the external power supply to provide power to the electromagnet when desired.

Because the default position of the differential kit is to have no power to the electromagnet and to have the clutch plate engage the armature plate due to the bias of the biasing members, in the event of a power failure, the vehicle will continue to have four-wheel drive capability. If power to the electromagnet was required for the vehicle to have four-wheel drive capability, a power failure would prevent the vehicle from using four-wheel drive and potentially cause safety issues if the driven wheels of the vehicle lose traction and experience slippage.

While the disclosure has been illustrated and described in detail in the drawings and foregoing description, the same is to be considered as illustrative and not restrictive in character, it being understood that only the preferred embodiments have been shown and described and that all changes and modifications that come within the spirit of the disclosure are desired to be protected.

The invention claimed is:

1. A differential assembly comprising:
   a ring gear defining a hollow interior opening;
   an engageable output hub positioned in said hollow interior of said ring gear, wherein said output hub includes two ends and each end of said output hub is adapted to be coupled with a driven shaft;
   a bearing assembly including a plurality of bearings, wherein said bearing assembly is positioned between said ring gear and said output hub, and wherein said bearing assembly has a first position in which said bearings engage both said ring gear and said output hub assembly so that torque is transferred from said ring gear to said output hub assembly, and wherein said bearing assembly has a second position in which said bearings do not engage said ring gear and said output hub assembly so that the ring gear does not transfer torque to said output assembly;
   an armature plate rotationally coupled to said bearing assembly;
   a clutch plate that is selectively engageable with said armature plate to selectively resist rotation of said armature plate;

an electromagnet;

an electrical coupler adapted to electrically connect said electromagnet to an external power supply;

a biasing member, wherein said biasing member biases said clutch plate to engage said armature plate, putting said bearing assembly into said first position; and, wherein when electricity from the external power supply is provided to said electromagnet, said electromagnet exerts magnetic force on said clutch plate that is sufficient to overcome the bias of said biasing member so that said clutch plate does not engage said armature plate.

2. The differential assembly of claim 1, wherein when electricity from said external power supply is provided to said electromagnet and said electromagnet exerts magnetic force on said clutch plate, said bearing assembly is in said second position.

3. The differential assembly of claim 1, wherein said bearings are in said second position when said clutch plate is not engaged with said armature plate.

4. The differential assembly of claim 1, wherein said clutch plate is configured to cause drag on said armature plate when said clutch plate engages said armature plate.

5. The differential assembly of claim 1, wherein when electricity is provided to said electromagnet, said electromagnet does not apply sufficient force to said armature plate to put said bearing assembly in said first position.

6. The differential assembly of claim 5, wherein said armature plate comprises a nonferrous material.

7. The differential assembly of claim 1, wherein said biasing member comprises a spring.

8. The differential assembly of claim 1, wherein said bearing assembly includes a roll cage, wherein said roll cage defines roller openings, and wherein a roller bearing is held in each of said roller openings.

9. The differential assembly of claim 1, further comprising a main housing cap, wherein said main housing cap defines at least one opening for receiving said at least one biasing member.

10. The differential assembly of claim 9, wherein said main housing cap defines a slot for receiving said electromagnet.

11. The differential assembly of claim 1, wherein said armature plate includes a finger and wherein said finger is adapted to rotationally couple said armature plate with said bearing assembly.

12. The differential assembly of claim 1, wherein said clutch plate is located between said electromagnet and said armature plate.

13. The differential assembly of claim 1, wherein said clutch plate is located between said biasing member and said armature plate.

14. A vehicle comprising:
the differential assembly of claim 1;
two front wheels and two rear wheels;
a power source operationally connected to a first drive shaft operationally connected to said two front wheels through the differential assembly of claim to selectively drive said two front wheels, and wherein said power source is operationally connected to a second drive shaft adapted to drive said two rear wheels.

15. A differential kit assembly comprising:
a main gear housing;
a pinion gear wherein said pinion gear is operationally attached to a drive shaft and wherein one end of said pinion gear is inserted into said main gear housing;
a ring gear including an inner diameter with a variable geometry and defining a hollow interior opening, wherein said ring gear is operationally connected to said end of said pinion gear which is inserted into said main gear housing;
an output hub assembly inserted into said hollow interior of said ring gear, wherein said output hub assembly defines a splined opening for receiving a driven shaft;
a bearing assembly including a plurality of bearings, wherein said bearing assembly is positioned between said ring gear and said output hub, and wherein said bearing assembly has a first position in which said bearings engage both said ring gear and said output hub assembly so that torque is transferred from said ring gear to said output hub assembly, and wherein said bearing assembly has a second position in which said bearings do not engage said ring gear and said output hub assembly so that the ring gear does not transfer torque to said output assembly;
a main housing cap defining a first and second slot and a first opening within a hollow interior;
a clutch plate inserted into said first slot within said main housing cap;
an electromagnet inserted into a second slot within said main housing cap;
an electrical coupler adapted to electrically connect said electromagnet to a power supply;
a biasing member inserted into a first opening in said main housing cap, wherein said biasing member biases said clutch plate to engage said armature plate;
wherein when electricity from the external power supply is provided to said electromagnet, said electromagnet exerts magnetic force on said clutch plate sufficient to overcome the bias of said biasing member so that said clutch plate does not engage said armature plate.

16. The differential assembly of claim 15, wherein said bearings are in said first position when said clutch plate engages said armature plate.

17. The differential assembly of claim 15, wherein said bearings are in said second position when said clutch plate is not engaged with said armature plate.

18. The differential assembly of claim 15, wherein said clutch plate is configured to cause drag on said armature plate when said clutch plate engages said armature plate.

19. The differential assembly of claim 15, wherein when electricity is provided to said electromagnet, said electromagnet does not apply sufficient force to said armature plate to put said bearing assembly in said first position.

20. The differential assembly of claim 19, wherein said armature plate comprises a nonferrous material.

* * * * *